United States Patent [19]

Munter et al.

[11] Patent Number: 4,816,826

[45] Date of Patent: Mar. 28, 1989

[54] DIGITAL TELEPHONE SWITCHING SYSTEM HAVING A MESSAGE SWITCH WITH ADDRESS TRANSLATION

[75] Inventors: Ernst A. Munter; Mahmood Sultan, both of Kanata; Youssef A. Geadah, Nepean, all of Canada

[73] Assignee: Northern Telecom Limited, Montreal, Canada

[21] Appl. No.: 40,410

[22] Filed: Apr. 20, 1987

[30] Foreign Application Priority Data

Mar. 13, 1987 [CA] Canada .................................. 532064

[51] Int. Cl.$^4$ ............................................ H04Q 11/04
[52] U.S. Cl. .............................. 340/825.520; 379/269; 370/59; 370/66
[58] Field of Search ................... 340/825.52, 825.07, 340/825.03, 825.52, 825.79; 370/53, 58, 62, 66, 59; 379/269, 268

[56] References Cited

U.S. PATENT DOCUMENTS 4,213,201 7/1980 Gagnier et al. ..................... 370/62
4,718,005 1/1988 Feigenbaum et al. .......... 340/825.52
4,747,130 5/1988 Ho ....................................... 370/66

FOREIGN PATENT DOCUMENTS 0274543 12/1986 Japan ......................... 340/825.07

*Primary Examiner*—Donald J. Yusko
*Attorney, Agent, or Firm*—F. P. Turpin

[57] ABSTRACT

The invention provides a communications system comprising a plurality of functional units including a switching network and peripheral units, and a message switch comprising a processor and data port circuits for interfacing with respective ones of the functional units. The message switch is adapted for interconnecting any one of the functional units with any other of the functional units. The data point circuits are connected to a transaction bus internal to the message switch and are respectively addressable by a physical address contained in the header of each message to be routed. The routing header of each message comprises a physical address and a logical address. The message switch also comprises a mapper circuit addressable by a predetermined physical address for translating the logical address to a physical address and for replacing the predetermined physical address with the translated physical address while the message data is retained in a source port message buffer.

8 Claims, 5 Drawing Sheets

PRIMARY PHYSICAL ADDRESS TABLE

| LA 65535 | PPA | PPA PARITY | PLAC | PLAC PARITY |
| 0 | | | | |

SECONDARY PHYSICAL ADDRESS TABLE

| LA 65535 | SPA | SPA PARITY | SLAC | SLAC PARITY |
| 0 | | | | |

PHYSICAL ADDRESS CLOSURE TABLE

| PA 65535 | PAC | PAC PARITY |
| 0 | | |

CARD CLOSURE TABLE

| CA 255 | CAC | CAC PARITY |
| 0 | | |

FIG. 6

DIGITAL TELEPHONE SWITCHING SYSTEM HAVING A MESSAGE SWITCH WITH ADDRESS TRANSLATION

The invention relates generally to a digital telephone switching system and more particularly to such a system having a message switch that provides address translation.

The contemporary telephone switching system is a common control stored-program machine usually comprising a central processing unit, a switching network and a plurality of peripheral units for connecting to subscriber lines, trunks or digital carrier facilities. The central processing unit communicates with the peripheral units through the switching network via a central message controller. The processor receives operational requests and responds thereto with commands to the various functional units of the system. A complete description of such a system is available from U.S. Pat. No. 4,213,201 issued July 15, 1980 to the same assignee as that of the present application. The main hardware modules of that system are the central control unit (CC), the central message controller (CMC), the input-output controller (IOC), the switching network (NM), and the peripheral modules (PM).

The core equipment (CC, CMC, IOC, and NM) is continuously being evolved mainly to increase system capacity and remove capacity bottlenecks in network traffic handling, system control messaging, and real time processing of calls. In a recent architectural evolution of the system, the control message multiplexing function of the CMC (one CC to many network/peripheral modules) was replaced by the message distribution function of a new system element, the message switch (MS). The message switch is a high capacity frame switch which can route messages between any and all of its ports. It operates as a high-bandwidth local area network, interconnecting various system processors. Thus, multiple control processors can share access to multiple network/peripheral modules via the message switch. In addition, autonomous messaging between network/peripheral modules can occur. The message switch provides a greatly increased message bandwidth over the CMC.

In conjunction with the introduction of the message switch, a new computing module (CM) was developed to replace the CC and thus provide increased processing power. To provide communications between the MS and CM a short range fiber optic transmission link operating at high bit rates is used. Its full bandwidth is available for CM message transmission, thus ensuring that transmission links are not a control message bottleneck in the system.

Since the message switch is configured as a LAN, its function consists in transferring a message from one of its ports to another one of its ports under control of its microprocessor. Thus, the MS is the messaging hub of the system, allowing various subsystems connected directly (computing module, switching network, I/O controller) or indirectly (peripherals) to its ports, to communicate freely with each other.

The message switch comprises a processor (MSP), a transaction-bus (T-bus) for performing port-to-port switching, a processor bus (P-bus) for interconnecting the MSP with other elements of the MS and data port cards for communication between the MS and the remainder of the system. The transfer of messages through the MS is done over the T-bus which performs basically as a packet switch. Each message to be routed contains a header comprising a destination address corresponding to an outgoing port of the switch. Each port is adapted to recognize is own address and thus accept messages on the bus. Therefore, in a message transfer, the destination for a data or message transfer is identified during an address cycle that precedes the data transfer.

In this type of system which has large portions thereof duplicated for reliability and which operates as a distributed processor it has been found desirable to define the destination of some messages by the function of its recipient and not by its physical appearance on a port of the message switch. Thus, whenever data links from the MS to functional units are reconfigured for whatever reason such as failure, maintenance, evolution of the system, or other, the functional destination remains the same.

Therefore, in accordance with the invention, the message switch is provided with a mapper circuit. Each message header is provided with a physical address and a logical address and the mapper circuit is responsive to a predetermined physical address for translating the logical address to a physical address and for replacing the predetermined physical address with the translated physical address.

A further advantage of having a mapper circuit in the message switch is that it provides the capability to flag various logical addresses for monitoring purposes and allows multiple logical addressed to be mapped to the same physical address.

An example embodiment of the invention will now be described in conjunction with the drawings in which:

FIG. 6 shows the configuration of the data tables in the memory illustrated in FIG. 5.

Figure 1:
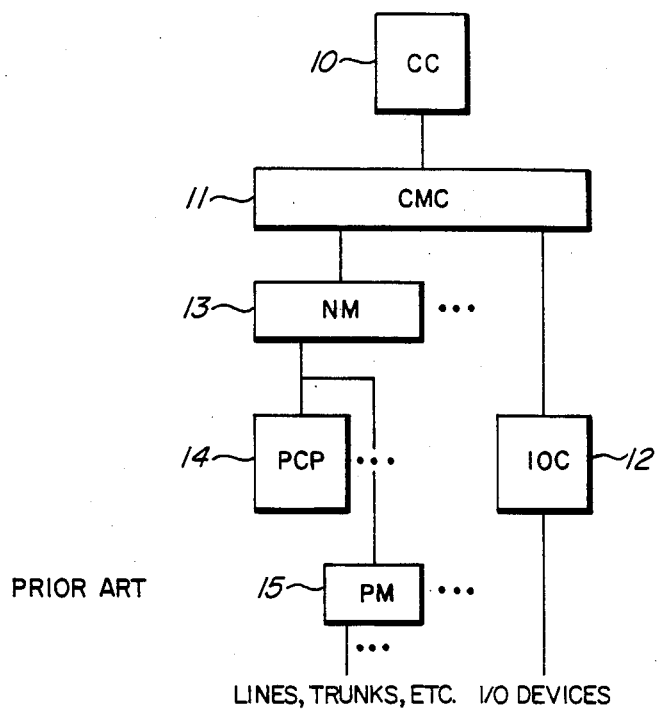
FIG. 1 is a block diagram illustrating the architecture of a prior art telephone switching system.

FIG. 1 illustrates the control structure of a contemporary digital telephone switching system which comprises a central control unit (CC) 10 connected to input/output devices via a central message controller (CMC) 11 and an input/output controller (IOC) 12. The central control unit 10 is also connected to lines and trunks of the telephone network via the CMC 11, a switching network (NM) 13 and peripheral modules (PM) 15, the latter being controlled by peripheral control processors (PCP) 14. Although some or all of the blocks or modules of such a system comprise a respective microprocessor, the call process control resides entirely in the central control 10 of the system. That is, the CC 10 receives information from the other units of the system and responds appropriately with commands and instructions to perform the usual functions of a switching office such as call routing and maintenance procedures.

In order to unload the central processor and thus increase the call handling capability of the system, it is desirable to replace the central message controller 11 which simply routed calls from and to the CC 10 with a device that allows the various subsystems connected directly or indirectly to its ports to communicate freely with each other.

Figure 2:
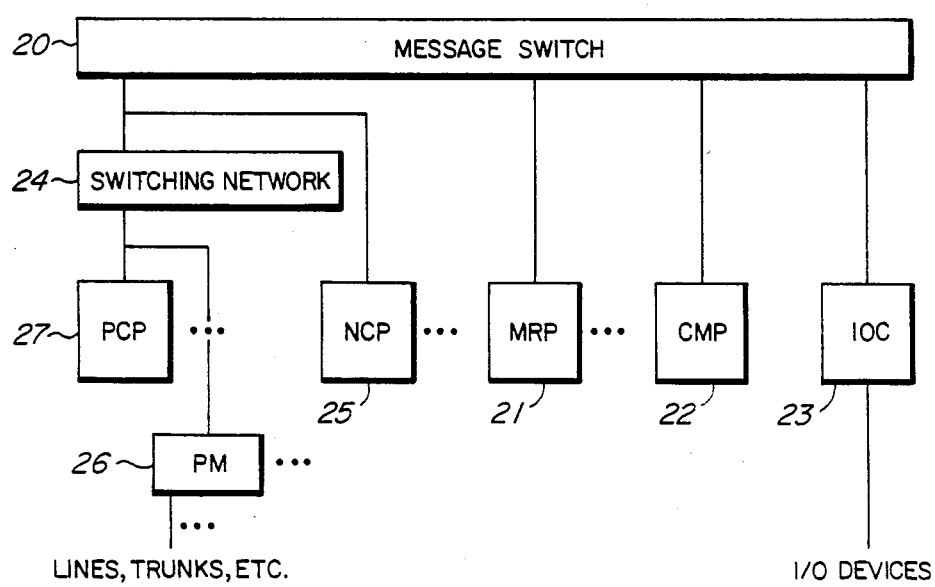
FIG. 2 is a block diagram illustrating the architecture of a digital telephone system having a distributed control structure and a message switch with address translation in accordance with the invention.

FIG. 2 shows the architecture of a telephone system having a distributed control structure and comprising a message switch 20 which is the messaging hub of the system. Its data ports are shown connected to various functional units of the system such as the message routing processor 21, the call management processor 22, and the input/output controller 23. It is also connected to the switching network 24 controlled by the network control processor 25 and to the peripheral modules 26 controlled by the peripheral control processor 27 via the switching network 24. Since the message switch is basically a high capacity frame switch, any pair of the units or nodes connected to it may exchange messages autonomously. Each unit wishing to send a message to another unit assembles the message as a packet of data preceded by the address of the destination and each message received at the message switch is routed in accordance with the destination address.

Figure 3:
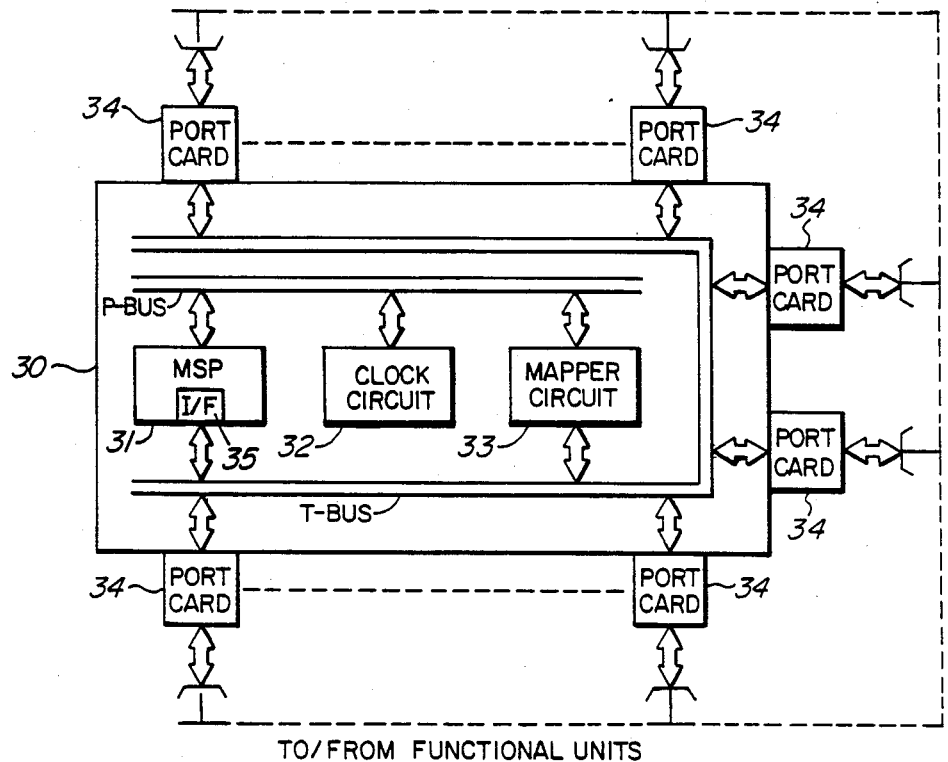
FIG. 3 is a block diagram of the message switch of FIG. 2.

FIG. 3 is a block diagram showing a message switch 30 comprising a message switch processor (MSP) 31, a clock circuit 32, a mapper circuit 33 as well as a processor bus (P-bus) and a transaction bus (T-bus). The switch 30 is connected to the functional units of the switching system (FIG. 2) via port cards 34 which are adapted to receive data messages in accordance with any one predetermined protocol such as DS-30, DMS-X, DMS-Y, HDLC, DS-512. These protocols are discussed in various publications including U.S. patent application Nos. 860,359, filed May 6, 1986 and 846,440, filed Mar. 31, 1986.

Each port card handles bidirectional data streams and includes input and output buffers for storing the data messages in transit. The port cards 34 are connected to the T-bus of the message switch and each one is adapted to recognize its own address on the bus. Therefore, each data link channel to the functional units is addressable by specifying the card and channel address identification of the destination node. A port card contains multiple ports (e.g. 32) which are referred to as channels. They may indeed be channels in a time division multiplex data link or they may be separate physical links. Although not shown, the port cards, are also connected to the P-bus for configuration control and maintenance.

From a functional point of view, the T-bus consists of an address/data bus which comprises a 32-bit wide, bidirectional bus carrying multiplexed address and data information, a control/status bus identifying the various states of the address/data bus, such as address cycles, data cycles, end-of-message cycle, etc. . . . , an access control bus for implementing an arbitration scheme for resolving bus contention, and a timing bus carrying all the necessary clock signals for the operation of the bus and the port cards.

As will be discussed later, the mapper circuit includes address translation tables. The MSP 31, clock circuit 32 and mapper circuit 33 communicate over the P-bus which controls the functions of the message switch. The MSP is allowed to communicate with other ports of the MS via a T-bus appearance through interface circuit 35. The translation tables of the mapper circuit 33 may be updated via the P-bus.

Figure 4:
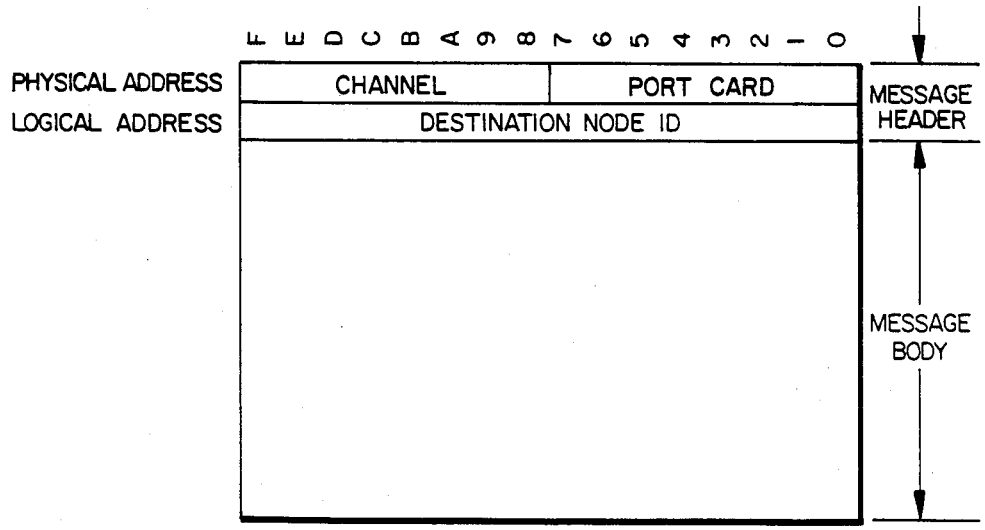
FIG. 4 is a diagram of the message format used in the message switch of FIG. 3.

As discussed previously, it is desirable in many cases to identify the destination address of a message by its logical or functional address. Therefore, the message switch must be able to support two types of addressing modes as shown in the message header field of the message format illustrated in FIG. 4. The physical address of a message destination is identified by the port card and data channel on that port card. The logical address of a message destination corresponds to a destination node identification. These two addressing modes are referred to as mapper bypass and mapper assist respectively. The source of the message indicates explicitly which mode is to be used by the message switch by using one predetermined physical address in the header, for example all ONE bits, which is recognized by the mapper circuit only. The latter is then responsive to its predetermined physical address to translate the logical address contained in the header of the message to a physical address on the T-bus. This is done without the mapper circuit 33 receiving the body of the message; it manipulates only the message header.

Figure 5:
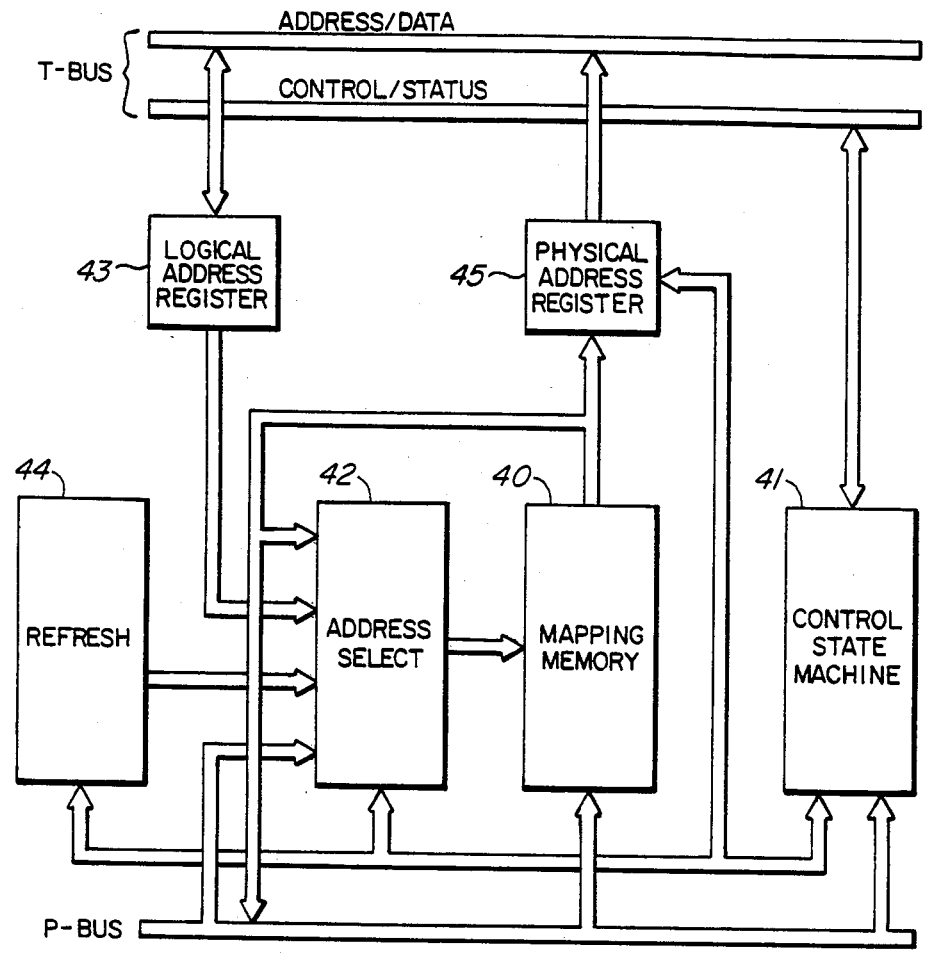
FIG. 5 is a block diagram of the mapper circuit of FIG. 3.

FIG. 5 is a block schematic diagram of the mapper circuit 33. It comprises a mapping memory 40 controlled by a state machine circuit 41. Locations of the memory 40 are selected by an address select circuit 42 which is connected directly to the P-bus, and is connected to the T-bus via a logical address register 43. The address select circuit 42 is also connected to a refresh circuit 44 adapted to refresh the content of the memory 40. The data port of the memory 40 is connected directly to the P-bus and to the T-bus via a physical address register 45. The mapping memory 40 thus receives: (1) T-bus logical addresses to be mapped to corresponding physical addresses, (2) translated physical addresses to be checked for validity, (3) refresh addresses, and (4) P-bus addresses from the MSP 31. In this embodiment, the memory 40 is a dynamic RAM, which therefore requires a periodic refresh. This may be done using a staggered refresh in which successive locations are refreshed at a rate such that the time to refresh them all is equal to the refresh rate. Of course, a static RAM which does not require refresh may also be used.

A mapping or translation operation consists of three to five separate phases which are initiated when a mapper-assist request is received on the T-bus; that is, when the mapper circuit 33 detects its predetermined address (e.g. all '1s') in the physical address portion of the header in a message. This operation presents the memory with the first two of the four addresses referred to above.

The mapping memory 40 contains several data tables which hold the data used to perform map operations for the T-bus. These tables are shown in FIG. 6. Two of the tables—the primary and secondary physical address tables—hold data about each of 65536 logical addresses (LA). The first piece of data is the physical address (PPA) associated with the LA and the second is a usable/unusable flag (PLAC) for the LA. There is also parity data for each of the two entries mentioned. As discussed above, primary and secondary (SPA, SLAC) tables are provided so that if the primary data is unusable, for whatever reason, the mapper can possibly map the LA to the secondary table rather than have the map operation fail. The other two tables—the physical address (PAC) and card (CAC) closure tables—contain the usable/unusable flag for each of the 65536 PAs. There is also parity data for these entries. All these tables are updated as necessary by the message switch 31.

The sequence of operations followed in response to a map request are as follows:

1. The LA obtained from the T-bus during Mapper-assist request phase is applied to the primary table to obtain the primary physical address (PPA). At the same time, the LA is applied to the same table to obtain the primary logical address closure bit (PLAC). This is used to verify that this is an allowable LA for the primary pass.

2. The PPA obtained from step 1 is applied to the physical address closure table and the card address closure table to obtain the physical address closure (PAC) and the card address closure (CAC). These are used to verify that the PA can be used. The PAC indicates whether the PA can be used, and the CAC indicates whether any of the PAs on the card where this one is located can be used. The function of the CAC is to shut down all the ports on a card more quickly.

3. If PLAC, PAC, or the CAC are closed, or the parity is violated on any of the above or on the PPA obtained, then the Mapper proceeds to try a map using the secondary table. If the above are all enabled, then the PPA is presented on the T-bus as a valid address.

4. In the secondary pass, the sequence of operations is almost identical to that of the primary pass. The LA is applied to the secondary table to obtain the secondary physical address (SPA). At the same time, the LA is applied to the same table to obtain the secondary logical address closure bit (SLAC). This is used to verify that this is an allowable LA for the secondary pass.

5. The SPA is applied to the physical address closure table and the card address closure table to obtain the PAC and CAC for this PA.

6. This time, if SLAC, PAC, or the CAC are closed, or the parity is violated on any of the above or on the SPA, then the mapper presents a Mapper unable-to-map Port (MUMP) signal on the T-bus and asserts an end-of-sequence (EOS) signal to show that the logical address could not be mapped. If the above are all correct, then the SPA is presented on the T-bus as a valid address.

The structure that initiates and sequences the four memory accesses discussed is the control state machine 41. It also initiates error checking at the end of the map sequence but its main function is to decide when a refresh, MSP access, or Map will be performed. As such, it interprets requests by the above and resolves priority disputes. Priority in a simultaneous request situation is as follows:

1. T-Bus (Map)
2. R-Bus (MSP)
3. Refresh unless the P-Bus has just been serviced, in which case the order is:

1. T-Bus (Map)
2. Refresh
3. P-Bus (MSP)

These relationships only exist during a cycle where all are requesting. No cycle, once initiated, can be interrupted as this would corrupt the data in the mapping memory.

Figure 7:
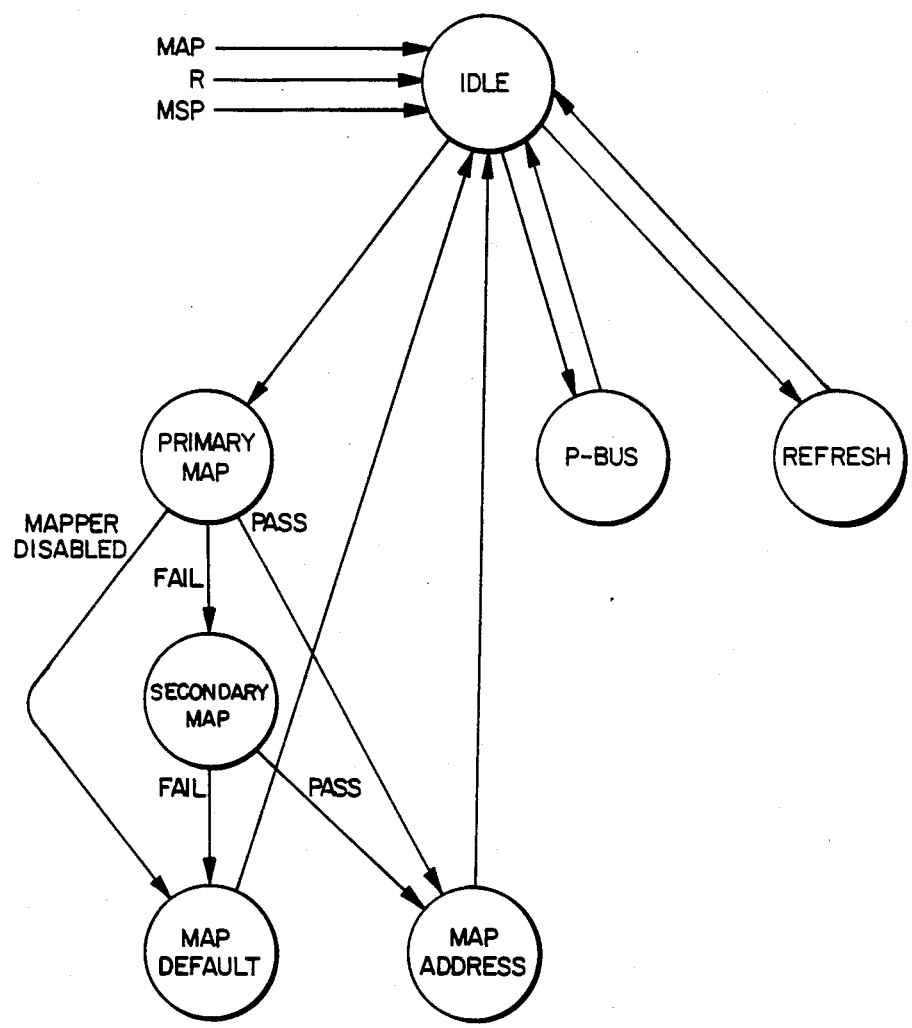
FIG. 7 is a flow chart illustrating the operation of the control state machine shown in FIG. 5.

A block diagram of the state flow is shown in FIG. 7 of the drawings. The state machine is controlled by three inputs MAP, R, and MSP and is in three sections: the MAP cycle, the refresh cycle and the MSP access cycle. The initial state after reset and any of the cycles is IDLE.

The transfer of a message from one port to another over the transaction bus of the message switch consists of two phases:

(1) An arbitration phase to resolve possible contention among many port interface units to determine which one should access the bus. This is triggered by source units having messages ready in their buffers, and is performed over an access control bus using an arbitration algorithm; and (2) a message transfer phase between the source port granted access and a destination port, either directly or with the assistance of the mapper.

The message transfer proceeds as follows. The source port initiates an address cycle, indicated on the control/status bus, placing on the address/data bus both destination address fields, physical and logical. It then withdraws temporarily its access from the bus. If the physical address field is not all 1's, it will contain the address of some existing message switch destination port which will detect a match with its hardwired address and accept the message. If, however, the physical address field is all 1's, the mapper will detect this data as its own physical address. The mapper response will be another address cycle containing the physical address translated from the provided logical address. A destination port is expected to match this field with its hardwired address. In either case, the destination port detecting a match will access the control/status bus to indicate whether or not it can accept the message. If the destination is ready, the source will regain control of the address/data bus, will enter a data cycle to transfer the message, indicating its end by a signal on the control/status bus. Throughout the transfer, the destination provides an indication to the source on its readiness to accept more data and on the detected sanity of the data, via bus parity. A problem encountered during a message transfer (buffer overflow, parity error) will be logged by the source to indicate the loss of that message, as the destination will discard it from its buffer. If the destination is non-existent or is not ready to accept a message after it has been primed, the source will time-out and log that condition as well. The source then releases the bus and the cycle repeats.

The invention thus provides a message switch which is adapted to transfer data messages between any two of its ports and wherein a destination node of the machine may be reached by a message source by specifying only the logical address of that node thus allowing the paths of messages within the switching system to be reconfigured without hardware changes to the system. The mapper circuit of the message switch performs the logical to physical address translation and allows multiple logical addresses to be mapped to the same physical address. In addition, since the address translation is performed dynamically while the message data is retained in the source port buffer memory, the body of the message occupies the transaction bus only once.

What is claimed is:

1. A communications system comprising, a plurality of functional units including a switching network and peripheral units, and a message switch comprising a processor, a mapper circuit and data port circuits for interfacing with respective ones of said functional units, the message switch being controlled by the processor and mapper circuit for interconnecting any one of the functional units with any other of the functional units, the data port circuits being connected to a transaction bus internal to the message switch and being respectively addressable by a physical address contained in the header of each message to be routed, the routing header of each message comprising a physical address and a logical address, the mapper circuit being addressable by a predetermined physical address and responsive thereto for translating the logical address to a physical address and for replacing said predetermined physical address with the physical address translated from the logical address.

2. A communications system as defined in claim 1 wherein the mapper circuit comprises a memory means and a controller for causing it to be addressed at said logical address to provide primary translated data comprising a primary physical address.

3. A communications system as defined in claim 2 wherein the controller is responsive to a translated primary physical address corresponding to a destination that is unavailable for causing the memory means to be addressed again at the logical address to provide secondary translated data comprising a secondary physical address.

4. A communications system as defined in claim 3 wherein the primary and secondary data further comprise closure data associated with the respective physical addresses.

5. A communications system as defined in claim 4 wherein the primary and secondary data also comprise parity data associated therewith.

6. A communications system as defined in claim 2 wherein the memory means is a read-write memory.

7. A communications system as defined in claim 6 wherein the mapper circuit is connected to the processor unit of the message switch whereby the content of the memory may be initially loaded and periodically updated with translation data.

8. A communications system as defined in claim 7 wherein the memory is a dynamic random access memory and the mapper circuit further comprises a circuit for refreshing the memory.

* * * * *